US008059634B1

(12) United States Patent
Evans

(10) Patent No.: US 8,059,634 B1
(45) Date of Patent: Nov. 15, 2011

(54) METHOD, SYSTEM, AND APPARATUS FOR ESTIMATING VOICE QUALITY IN A VOICE OVER PACKET NETWORK

(75) Inventor: Mark Evans, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1074 days.

(21) Appl. No.: 11/147,875

(22) Filed: Jun. 8, 2005

Related U.S. Application Data

(60) Provisional application No. 60/675,291, filed on Apr. 27, 2005.

(51) Int. Cl.
 *H04L 12/66* (2006.01)
(52) U.S. Cl. .................................................. 370/356
(58) Field of Classification Search .......... 370/252, 370/352, 356; 709/224, 230; 375/230, 232, 375/350
 See application file for complete search history.

(56) References Cited

U.S. PATENT DOCUMENTS

| | | | | |
|---|---|---|---|---|
| 7,075,981 | B1 * | 7/2006 | Clark | 375/224 |
| 7,372,844 | B2 * | 5/2008 | Lee | 370/349 |
| 7,606,164 | B2 * | 10/2009 | Anandakumar et al. | 370/252 |
| 7,653,045 | B2 * | 1/2010 | Anandakumar et al. | 370/352 |
| 7,822,021 | B2 * | 10/2010 | Anandakumar et al. | 370/352 |
| 2002/0051464 | A1 * | 5/2002 | Sin et al. | 370/466 |
| 2003/0091165 | A1 * | 5/2003 | Bearden et al. | 379/88.08 |
| 2003/0093513 | A1 * | 5/2003 | Hicks et al. | 709/224 |
| 2004/0034492 | A1 * | 2/2004 | Conway | 702/81 |
| 2004/0073690 | A1 * | 4/2004 | Hepworth et al. | 709/230 |
| 2004/0232106 | A1 * | 11/2004 | Oka et al. | 216/26 |
| 2008/0151769 | A1 * | 6/2008 | El-Hennawey et al. | 370/252 |

OTHER PUBLICATIONS

ITU-T G.107; "The E-model, a computational model for use in transmission planning" Jun. 2002.*
ITU-T G.107; The E-model, a computational model for use in transmission planning. ; Jul. 2002.*
ITU-T Recommendation G.113 Transmission Impairments due to speech processing. Feb. 2001).*
ITU-T G.107; Jul. 2002; "The E-model, a computational model for use in transmission planning".
H. Schulzrinne; Network Working Group Request for Comments: 3550; Obsoletes: 1889 Category: Standards Track; memo/ RTP: A Transport Protocol for Real-Time Applications.
ITU-T Recommendation G.113 Transmission Impairments. (Feb. 2001).
ITU-T Recommendation G. 113—Appendix 1 (May 2002).

* cited by examiner

*Primary Examiner* — Thai Hoang

(57) ABSTRACT

This present invention provides a method, system, and apparatus for determining voice quality in a VOP network. The present invention implements the ITU-T E-model in a packet network. It implements the ITU-T E-model in a simplified approach using a straight-line estimate. Voice quality is estimated by assigning constant values to parameters in the ITU-T E-model and using data collected in a voice call.

19 Claims, 10 Drawing Sheets

| Parameter | Abbr. | Unit | Default value | Permitted range | Remark |
|---|---|---|---|---|---|
| Send Loudness Rating | SLR | dB | +8 | 0 ... +18 | Note 1 |
| Receive Loudness Rating | RLR | dB | +2 | −5 ... +14 | Note 1 |
| Sidetone Masking Rating | STMR | dB | 15 | 10 ... 20 | Note 2 |
| Listener Sidetone Rating | LSTR | dB | 18 | 13 ... 23 | Note 2 |
| D-Value of Telephone, Send Side | Ds | − | 3 | −3 ... +3 | Note 2 |
| D-Value of Telephone Receive Side | Dr | − | 3 | −3 ... +3 | Note 2 |
| Talker Echo Loudness Rating | TELR | dB | 65 | 5 ... 65 | |
| Weighted Echo Path Loss | WEPL | dB | 55 | 5 ... 110 | |
| Mean one-way Delay of the Echo Path | T | msec | =Ta | 0 ... 500 | Note 5 |
| Round Trip Delay in a 4-wire Loop | Tr | msec | =2x Ta | 0 ... 1000 | Note 6 |
| Absolute Delay in echo-free Connections | Ta | msec | Delay value | 0 ... 500 | Note 7 |
| Number of Quantization Distortion Units | qdu | − | 1.7 | 1 ... 14 | Note 4 |
| Equipment Impairment Factor | Ie | − | 0 | 0 ... 40 | |
| Packet-loss Robustness Factor | Bpl | − | 1 | 1 ... 40 | Note 3 |
| Random Packet-loss Probability | Ppl | % | 0 | 0 ... 20 | Note 3 |
| Circuit Noise referred to 0 dBr-point | Nc | dBm0p | −70 | −80 ... −40 | |
| Noise Floor at the Receive Side | Nfor | dBmp | −64 | − | Note 3 |
| Room Noise at the Send Side | Ps | dB(A) | 35 | 35 ... 85 | |
| Room Noise at the Receive Side | Pr | dB(A) | 35 | 35 ... 85 | |
| Advantage Factor | A | − | 0 | 0 ... 20 | |

METHOD, SYSTEM, AND APPARATUS FOR ESTIMATING VOICE QUALITY IN A VOICE OVER PACKET NETWORK

CROSS-REFERENCE TO RELATED APPLICATIONS

This application claims the benefit of U.S. Provisional Application No. 60/675,291, filed Apr. 27, 2005.

STATEMENT REGARDING FEDERALLY SPONSORED RESEARCH OR DEVELOPMENT

Not applicable.

TECHNICAL FIELD

This invention relates to the field of telecommunications, computer software, and internet protocols. It includes telephone handsets, test equipment, computer hardware, and transmission performance parameters.

BACKGROUND OF THE INVENTION

As technology progresses in telecommunications, voice quality of a telephone call is a major concern. For years, service providers operating in the public switched telephone network (PSTN) have implemented various devices to monitor and measure voice quality. Service providers use test equipment placed at various points in their networks to measure transmission parameters associated with voice calls. The test equipment collects data regarding voice calls for subsequent analysis. In some instances, test equipment is sophisticated enough to measure voice calls, make an analysis, and provide the results to an administrator or technician overseeing the test.

In a network as large as the PSTN, service providers have a task to monitor various parts of the network to ensure sufficient voice quality for customers. Unfortunately, test equipment cannot perform the job alone to monitor and measure voice quality. For years, service providers have employed a scheme to embed the functions of their test equipment into telecommunication products. Commercially-available products such as switching equipment and transmission equipment contain various testing functions reducing the need to purchase test equipment separately. For example, a digital switch might include functionality to initiate test calls to a particular destination or another digital switch to measure transmission parameters. With their telecommunications products, service providers can measure voice quality at various points in their network. For example, service providers can make test calls using dedicated circuits in their network. Services providers can also place dedicated equipment in their network to respond to the test calls or perform other types of tests. With this flexibility, a test call can be made all the way to a customer's premise from a remote location such as a telephone exchange (switch).

Monitoring and measuring of voice quality are so important that there are documents covering transmission planning in a PSTN network to monitor, measure, and improve voice quality of a telephone call. The key documents in this area were developed by the International Telecommunications Union (ITU) through its series of documents called recommendations. More particularly, the telecommunication standardization section of the ITU, known as ITU-T, has developed a series of documents covering almost every aspect of telecommunications. Various documents provide information regarding the following: transmission planning that may be employed for a voice network; transmission parameters that may be measured in the voice network; and calculations and analyses that may be performed to obtain results. An overarching goal of ITU-T documents is to provide a uniform way for service providers to interact with each other with their products in a network. Much of the documentation that exists today is focused towards a time division multiplexing (TDM) network associated with the PSTN.

An example of the ITU-T's work includes a document for estimating voice quality called ITU-T RECOMMENDATION G.107, THE E-MODEL, A COMPUTATIONAL MODEL FOR USE IN TRANSMISSION PLANNING (JULY 2002) [hereinafter ITU-T G.107]. This document contains a complex model, known as the ITU-T E-model, with twenty-three (23) parameters for estimating voice quality. The model is complex because the parameters are numerous and change from one voice call to another.

For packet networks, very little, if any, equipment exists to provide testing functions at the level found in the PSTN. This deficiency has been recognized in the industry, and thus, documentation for a packet network has recently began to appear. Many of the gains achieved with the measuring of performance in the TDM network are desired in the packet network. An example of a packet network includes voice over packet (VOP) network. A VOP network may include, but not be limited to, voice over internet protocol (VoIP), voice over asynchronous transfer mode (ATM), voice over frame relay, and VoIP over wireless local area network (LAN).

A lot of work has occurred over the years to determine the parameters that comprise voice quality in a network. Much of the research has culminated into ITU-T Recommendations created for TDM network designers. The ITU-T E-model is a result of that research which was designed to help TDM network designers create sub-networks in the PSTN. With the growth of VOP in the packet network, a solution is needed to apply the concepts included in the ITU-T E-model to packet networks. Service providers operating in a packet network environment would like to be able to measure performance from a location in their network to the customer's premise. They would desire to measure this performance without making test calls, but be able to monitor and measure performance based on the actual telephone calls that occur in the packet network.

SUMMARY OF THE INVENTION

This disclosure describes, among other things a method, system, and apparatus for determining voice quality in a VOP network. The present invention implements the ITU-T E-model in a packet network. It implements the ITU-T E-model in a simplified approach using a straight-line estimate. Voice quality is calculated by assigning constant values to a set of parameters in the ITU-T E-model and using data collected in a voice call for the remaining parameters.

In accordance with the present invention, a method for estimating voice quality in a VOP network is provided that includes collecting statistics from RTP and RTCP streams in a VOP call at a computing device. Delay, packet loss, and jitter are calculated from the collected statistics. A transmission rating factor is calculated using a straight-line estimate.

In another aspect, a method for calculating a transmission rating factor in a simplified manner is provided that includes measuring a mean one-way delay, a round-trip delay, and an absolute delay in a VOP call at a computing device connected to a network. A weighted echo path loss is set to 55 dB and a quantizing distortion unit is set to 1.7. The quantizing distortion unit corresponds to an echo canceller in a network path of the VOP call. Parameters associated with an ITU-T E-model are assigned constant values. Round-trip delay is set to two times an absolute delay in a four-wire connection and a mean one-way delay is set to the absolute delay, assuming a perfect echo cancellation. The transmission rating factor is calculated using the ITU-T E-model.

In yet another aspect, an apparatus for estimating voice quality in a VOP network is provided that includes a means for collecting statistics from RTP and RTCP streams in a VOP call, a means for measuring at least one of a delay, packet loss, and jitter from the collected statistics, and a means for calculating a transmission rating factor using a straight-line estimate.

In yet another aspect, an apparatus for calculating a transmission rating factor in a simplified manner is provided that includes a means for measuring at least one of a mean one-way delay, a round-trip delay, and an absolute delay in a VOP call, a means for setting a weighted echo path loss to 55 dB and a quantizing distortion unit to 1.7, the quantizing distortion unit corresponding to an echo canceller in a network path of the VOP call, a means for assigning constant values to a plurality of parameters associated with an ITU-T E-model, a means for setting a round-trip delay equal to two times an absolute delay in a four-wire connection and a mean one-way delay equal to the absolute delay, indicating a perfect echo cancellation, and a means for calculating the transmission rating factor using the ITU-T E-model.

In yet another aspect, a method for estimating voice quality in a VOP network is provided that includes collecting statistics from RTP and RTCP streams in a VOP call. A transmission rating factor is calculated from the statistics in a straight-line estimate. The transmission rating factor is converted to an MOS to determine voice quality.

In yet another aspect, a method for estimating voice quality in a VOP network is provided that includes collecting statistics from RTP and RTCP streams in a VOP call at a device containing embedded logic. Delay, packet loss, and jitter are measured from the collected statistics. A transmission rating factor is calculated using a straight-line estimate.

In yet another aspect, a method for calculating a transmission rating factor in a simplified manner is provided that includes measuring a mean one-way delay, a round-trip delay, and an absolute delay in a VOP call at a device containing embedded logic. A weighted echo path loss is set to 55 dB and a quantizing distortion unit is set to 1.7. The quantizing distortion unit corresponds to an echo canceller in network path of the VOP call. Parameters associated with an ITU-T E-model are assigned constant values. Round-trip delay is set to two times an absolute delay in a four-wire connection and a mean one-way delay is set to the absolute delay, assuming a perfect echo cancellation. The transmission rating factor is calculated using the ITU-T E-model.

BRIEF DESCRIPTION OF THE SEVERAL VIEWS OF THE DRAWINGS

The present invention is described in detail below with reference to the attached drawing figures, which are incorporated herein by reference, and wherein:

FIG. 4 is a block diagram of an exemplary table of transmission parameters for the ITU-T E-model;

DETAILED DESCRIPTION OF THE INVENTION

The present invention will be better understood from the detailed description provided below and from the accompanying drawings of various embodiments of the invention, which describe, for example, method, system, and apparatus for estimating voice quality in a VOP network. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

To help explain the invention without obscuring its functionality, a preferred embodiment will now be referenced in connection with a computing network. Although the present invention can be employed in connection with a computing-network environment, it should not be construed as limited to the exemplary applications provided here for illustrative purposes.

Simplified E-model for Estimation of R Factor

Figure 1:
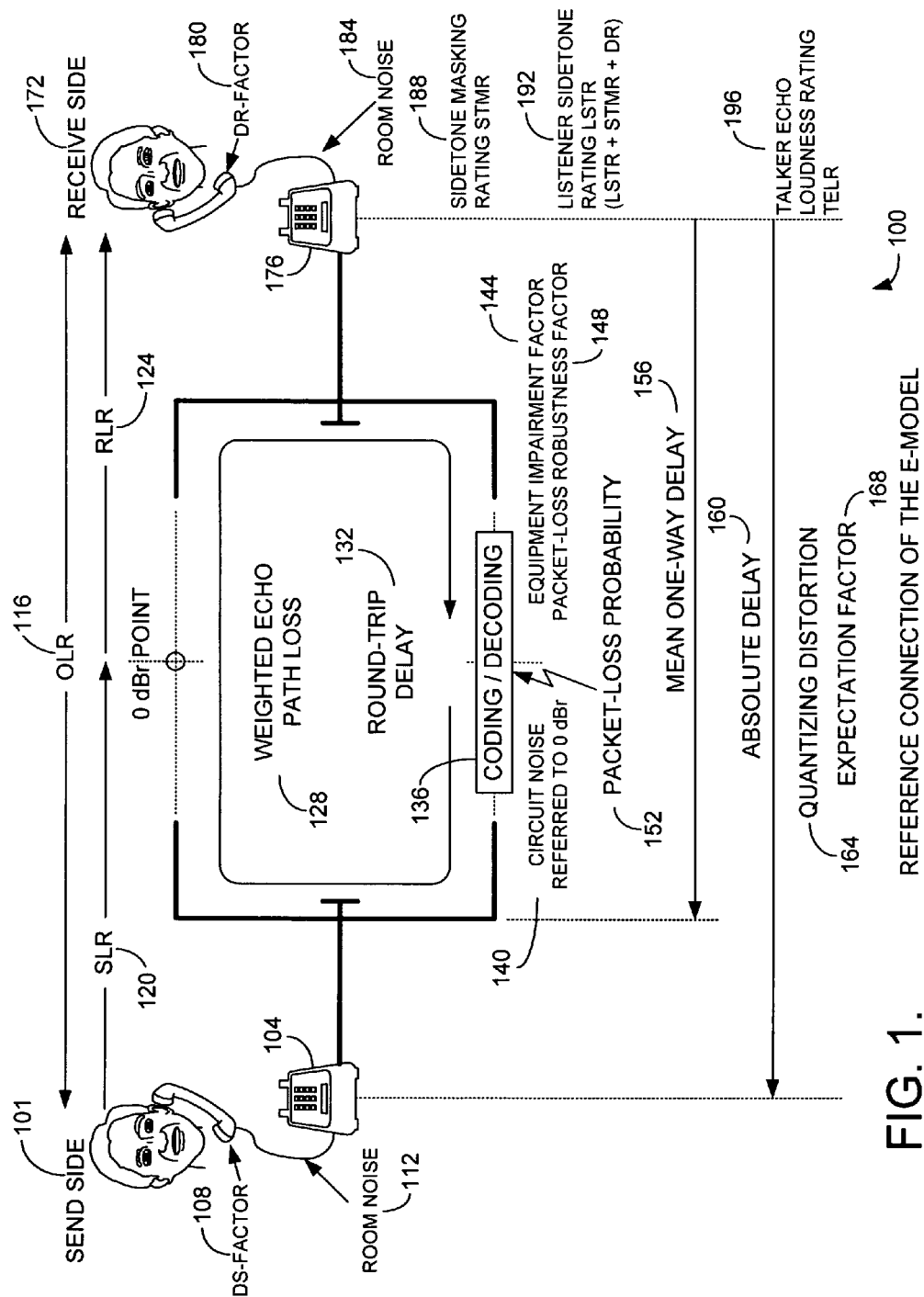
FIG. 1 is a block diagram of transmission parameters in an exemplary talking scenario for an embodiment of the present invention.

In FIG. 1, a block diagram is shown illustrating a reference connection of the ITU-T E-model. The reference connection depicts a send side 101 and a receive side 172 with the transmission characteristics that occur between them. The information contained in reference connection 100 may be found in ITU-T G.107, supra which is herein incorporated by reference.

Reference connection 100 is a pictorial representation associated with the ITU-T E-model. Reference connection 100 shows a conversational quality from mouth-to-ear as perceived by a user at receive side 172, both as listener and talker.

Although a detailed explanation is provided in ITU-T G.107, supra, a brief description of reference connection 100 is provided to give a reader an understanding of the transmission parameters involved in implementing an embodiment of the present invention. Several transmission parameters will be briefly discussed below followed by more details of an embodiment of the present invention.

The ITU-T E-model is based on the equipment impairment factor method and other parameters. In FIG. 1, with users talking at a telephone 104 and a telephone 176, voice quality may be impacted by a number of transmission factors. These factors may include a send loudness rating (SLR) 120, a receive loudness rating (RLR) 124, an overall loudness rating (OLR) 116, a Ds-factor 108, a Dr-factor 180, a room noise (Ps) 112, a room noise (Pr) 184, a weighted echo path loss (WEPL) 128, a round-trip delay (Tr) 132, a circuit noise (Nc) 140, an equipment impairment factor (Ie) 144, a packet loss robustness factor (Bpl) 148, a packet loss probability (Ppl) 152, a mean one-way delay (T) 156, an absolute delay (Ta) 160, a quantizing distortion unit (qdu) 164, an expectation factor (A) 168, a sidetone masking rating (STMR) 188, a listener sidetone rating (LSTR) 192, and a talker echo loudness rating (TELR) 196.

The parameters SLR 120, RLR 124, and OLR 116 provide a loudness rating between a talker and a listener over a telephone connection. SLR 120, RLR 124, and OLR 116 measure a loss in "loudness" between a talker's mouth in send side 101 and a listener's ear in receive side 172. OLR 116 is the sum of SLR 120 and RLR 124. The parameters SLR 120, RLR 124, and Nc 140 are referred to a defined 0 dBr point as shown in FIG. 1. Ds-factor 108 and Dr-factor 180 are D-Values of the telephone for the send side and receive side respectively. Ps 112 and Pr 184 represent room noise for the respective send side and receive side. WEPL 128 represents a weighted echo path loss used for calculating listener echo. Ie 144 is the equipment impairment factor. Bpl 148 is the packet loss robustness factor. Ppl 152 is the packet loss probability. qdu 164 is the number of quantizing distortion. A 168 is the expectation factor. STMR 188 is the side-tone masking rating. LSTR 192 is the listener side-tone rating which is a sum of STMR 188 and Dr-factor 180. TELR 196 is the talker echo loudness rating.

There are three parameters associated with transmission time: Ta 260, T 156, and Tr 132. Ta 160 is an absolute delay for a total one-way delay between send side 101 and receive side 172. Ta 160 may be used to estimate the impairment due to too-long delay. T 156 is a mean one-way delay between receive side 172 and a point in a connection where a signal coupling occurs as a source of echo. Tr 132 is a round-trip delay in a 4-wire loop, where a "double reflected" signal will cause impairments due to listener echo (see WEPL 128).

Some transmission parameters that influence voice quality which are not shown in FIG. 1, but may be derived from some of the previously discussed parameters, include a simultaneous impairment factor (Is), a delay impairment factor (Id), and an effective equipment impairment factor (Ie,eff). Is is a combination of all impairments which occurs more or less simultaneously with a voice signal. Id represents the impairments caused by delay of voice signals. Ie,eff represents impairments caused by low bit-rate codecs. Ie,eff also includes impairments due to packet losses of random distribution.

Many of the transmission parameters that affect voice quality have been mentioned without going into a lot of details. More details for each transmission parameter may be obtained from ITU-T G.107, supra and ITU-T RECOMMENDATION G.113, TRANSMISSION IMPAIRMENTS, (2001) [hereinafter ITU-T G.113] which is also herein incorporated by reference.

An embodiment of the present invention implements a method for calculating a transmission rating factor (R factor) based on measured delay and average packet loss. The present invention calculates the R factor as: $R = Ro - Is - Id - Ie,eff + A$, which is also known as the ITU-T E-model. Ro represents a basic signal-to-noise ratio including circuit noise, Nc 140, and room noises, Ps 112 and Pr 184. A is the advantage factor which is A 168, previously identified as the expectation factor. A 168 represents a compensation factor for impairment factors when there are other advantages of access available to the user. In most instances, A 168 may be zero corresponding to a wirebound or wireline network connection. Otherwise, A 168 may have a maximum value of 5 corresponding to a mobility call in a cellular network operating in a building, a maximum value of 10 corresponding to a mobility call in a geographical area or a moving vehicle, and a maximum value of 20 corresponding to a mobility call in hard-to-reach locations like a multi-hop satellite connection. For an embodiment of the present invention, A 268 may be set to zero to impart no advantage to calculating the transmission rating factor.

Figure 2A:
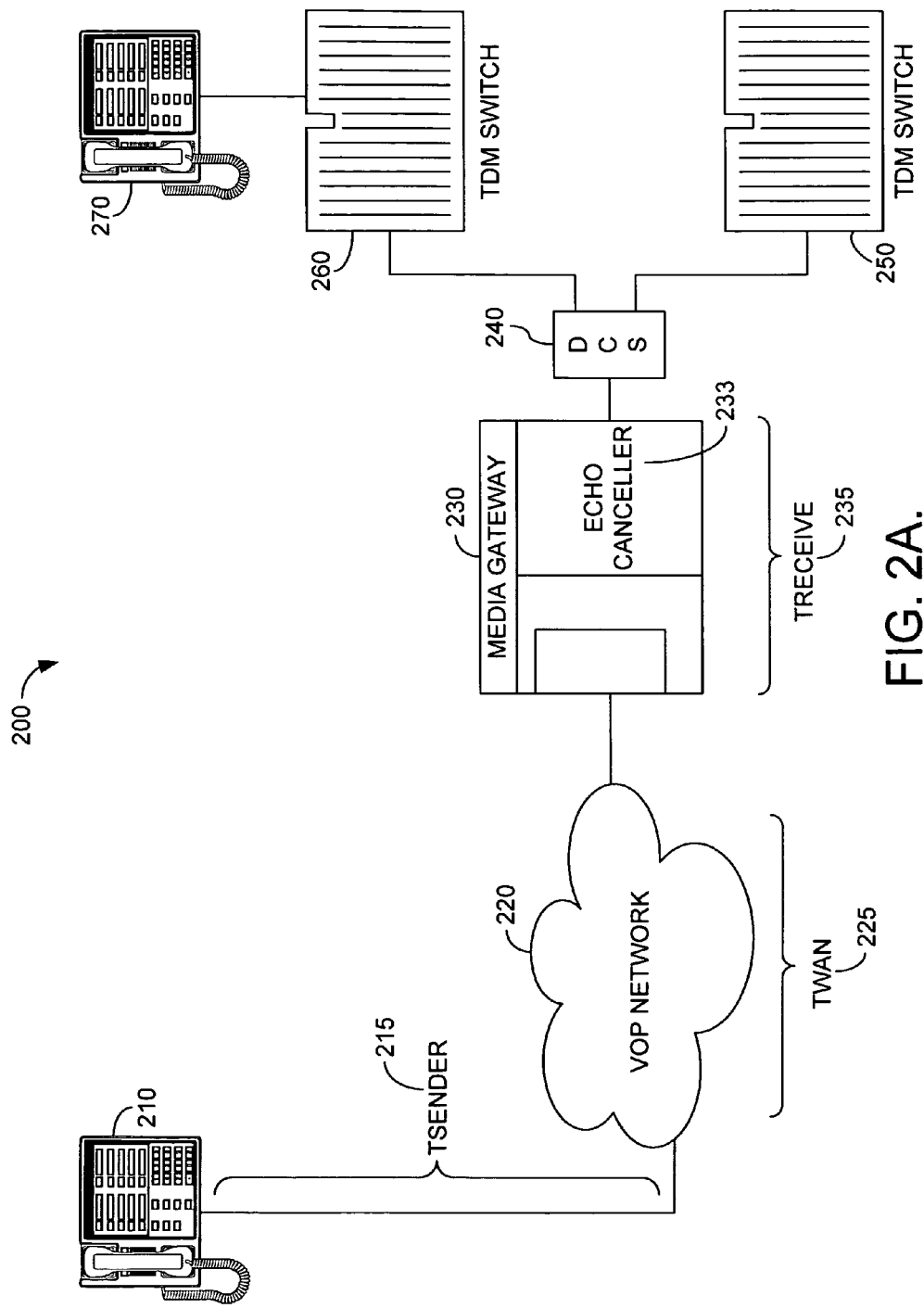
FIGS. 2A and 2B are block diagrams of an exemplary operating environment suitable for practicing an embodiment of the present invention.

Referring now to FIG. 2A, a block diagram of a network 200 is shown with a VOP terminal 210, a media gateway 230, a digital cross-connect (DCS) 240, time division multiplexing (TDM) switches 250 and 260, and a TDM terminal 270. Network 200 shows an illustration of a packet network and PSTN network connected together. The packet network is characterized by equipment from VOP terminal 210 to media gateway 230 containing VOP network 220. The PSTN network is characterized by equipment from media gateway 230 to TDM terminal 270 and TDM switch 250.

VOP terminal 210 is a device that can initiate and receive a VOP call. In FIG. 2A, VOP terminal 210 is shown as a telephone. However, VOP terminal 210 may be a computing device, monitoring device, or test equipment. Likewise, TDM terminal 270 may be a telephone but also a computing device containing an analog modem, a monitoring device, or test equipment.

A voice telephone call may exist between VOP terminal 210 and TDM terminal 270. FIG. 2A is an exemplary illustration of a talking path for the voice telephone call. FIG. 2A is not a detailed mapping of every equipment that may be found in the voice telephone call. The illustration is provided to show an exemplary connection that goes through VOP network 220, media gateway 230, echo canceller 233, DCS 240, and TDM switch 260. One ordinary skilled in the art may find more documentation on the various equipment and devices that may be implemented to create network 200 as shown.

It is understood in the industry, with regards to the packet network, that voice quality is impacted by delay, jitter, and packet loss. Voice quality is impacted by various types of delay such as absolute end-to-end delay, discussed earlier as Ta 160. Ta 160 includes delay from a TSender 215, a Twan 225, and a TReceive 235. FIG. 2A illustrates where these delay parameters may be encountered in network 200. As one may see, these parameters occur most often in the packet network. However, the same parameters may exist in the PSTN network as well.

TSender 215 represents a coding and packetization delay in the sending equipment. TSender 215 may be assumed to be a fixed delay but is dependent on the type of codec(s) implemented in the network. Twan 225 is a one-way delay in VOP network 220 as measured by monitoring equipment and derived from a protocol round-trip delay. TReceive 235 is a jitter buffer and decoding delay in the receiving equipment, shown as media gateway 230. TReceive 235 may also be assumed to be fixed. The sum of the three parameters equal Ta 160 and may be used in the ITU-T E-model to provide the transmission rating factor.

Figure 2B:
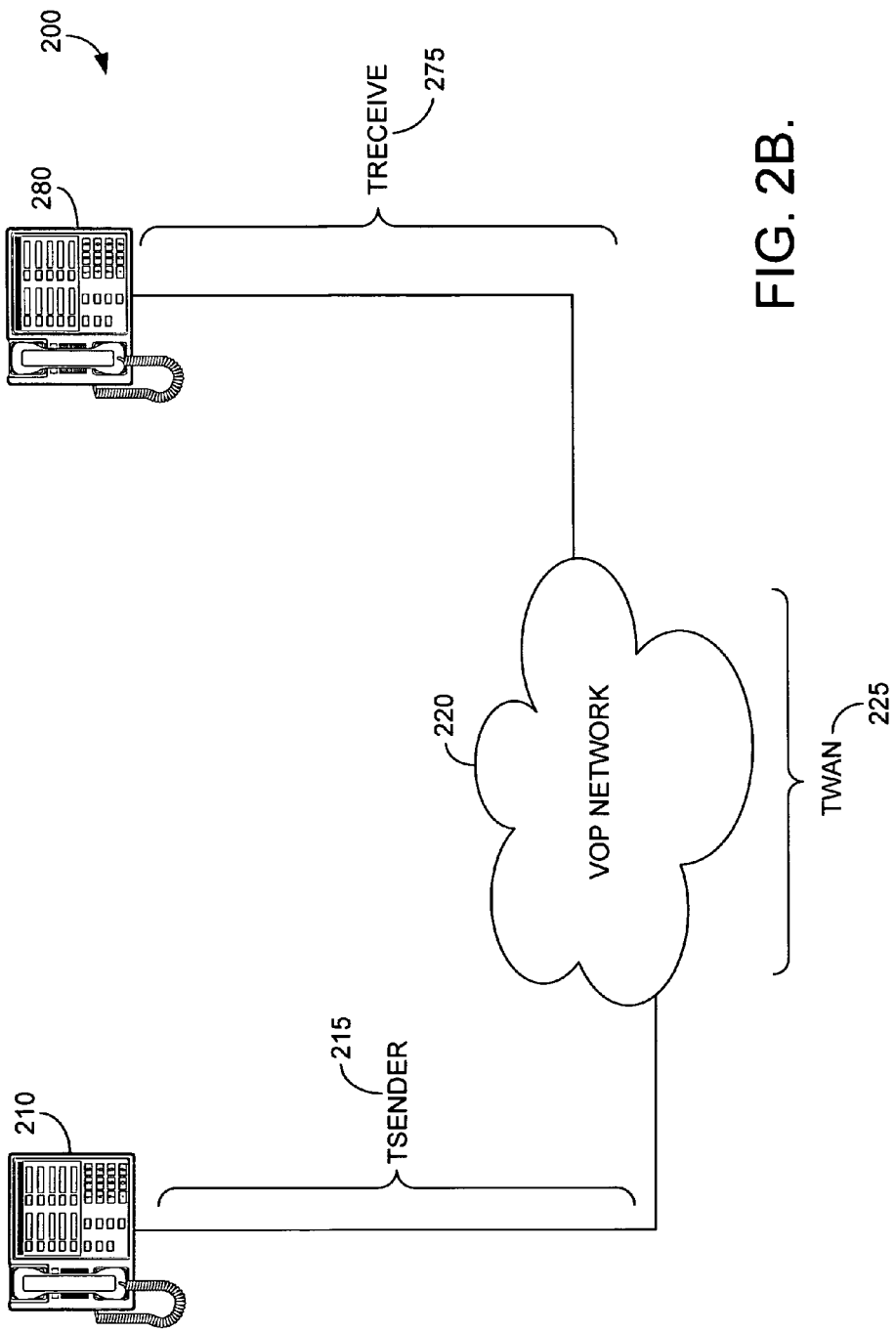

FIG. 2B is another illustration of the same network 200 except without the PSTN but adding another VOP terminal. A VOP call occurs entirely in the packet network. Both VOP terminal 210 and a VOP terminal 280 may be the same devices as discussed earlier for VOP terminal 210. In FIG. 2A, TReceive 235 may be measured at media gateway 230. In FIG. 2B, TReceive 235 may be measured at VOP terminal 280, the corresponding receiving equipment for purposes here.

One of the challenges of testing voice quality in a packet network is the lack of testing equipment and the lag in availability and development of equipment similar to that developed for the TDM/PSTN network. Rather than try to re-create the same testing equipment or try to build the same testing functionality into products that operate in a packet network environment, the present invention implements an embodiment whereby testing or test calls are not needed to estimate voice quality.

An embodiment of the present invention implements a way to monitor and estimate voice quality in the packet network without establishing test calls or implementing test equipment. The present invention implements the embodiment by monitoring or detecting a real-time transport protocol (RTP) and/or a real-time transport control protocol (RTCP) in a VOP call in the packet network. RTP is a protocol implemented to carry voice over packet. RTCP is an associated protocol that provides information about a particular RTP stream including packet loss, jitter, and timing information. Details about RTP and RTCP may be found in THE INTERNET SOCIETY, RTP: A TRANSPORT PROTOCOL FOR REAL-TIME APPLICATIONS, (2003) [hereinafter RTP STANDARD] which is herein incorporated by reference.

Figure 3A:
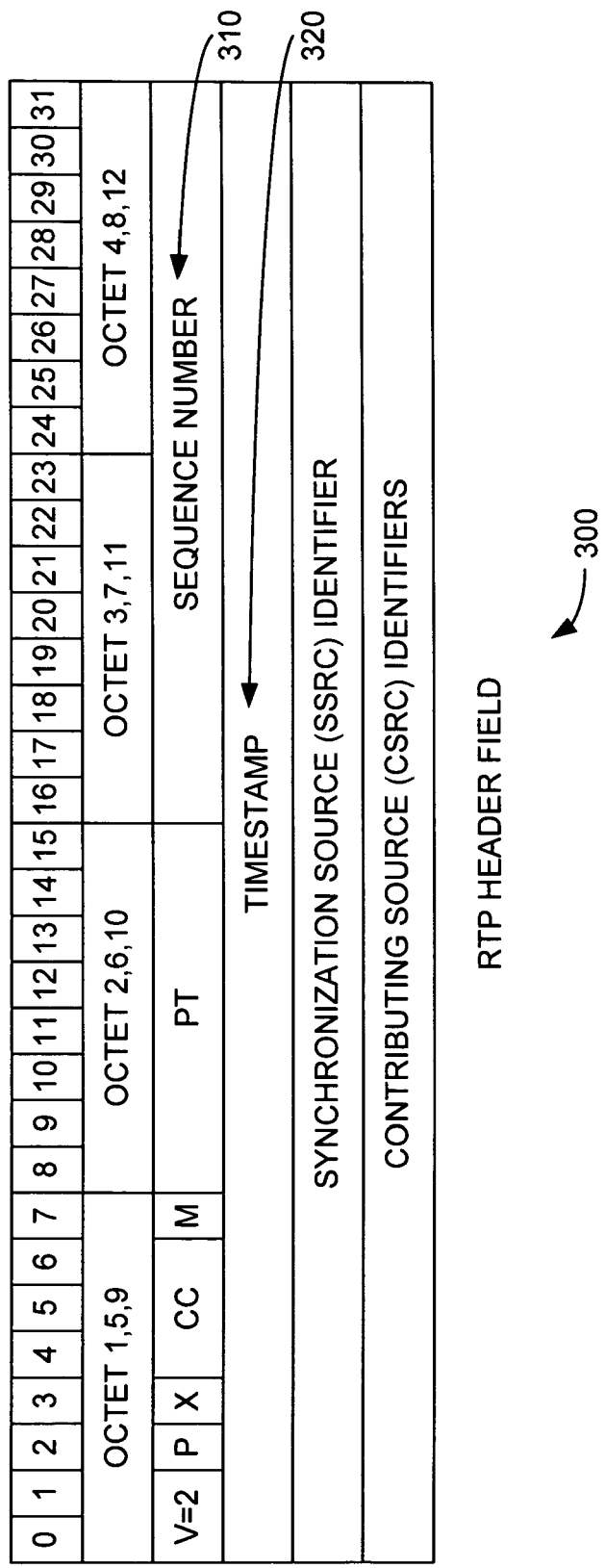
FIGS. 3A, 3B, and 3C are block diagrams of exemplary RTP and RTCP protocol packets.

In FIG. 3A, a block diagram of a RTP header field 300 is shown illustrating information contained within the header field of a RTP packet. RTP header field 300 contains information regarding delay and packet loss. Each RTP packet has a unique sequence number when it is created as shown by a sequence number 310. RTP packets are sequentially numbered when they are sent. Therefore, upon arrival of the RTP packets at the receiving end of a device, one may detect packet loss if the RTP packet with a particular sequence number 310 does not arrive within a designated timeframe. Sequence number 310 may also be used to restore a packet's sequence.

Each RTP packet has a timestamp 320 identifying a time when the RTP packet was created. Timestamp 320 is related to a sampling instant of a first octet in an RTP data packet. Timestamp 320 provides a mechanism to maintain synchronization but may also be used to determine jitter and delay.

Figure 3B:
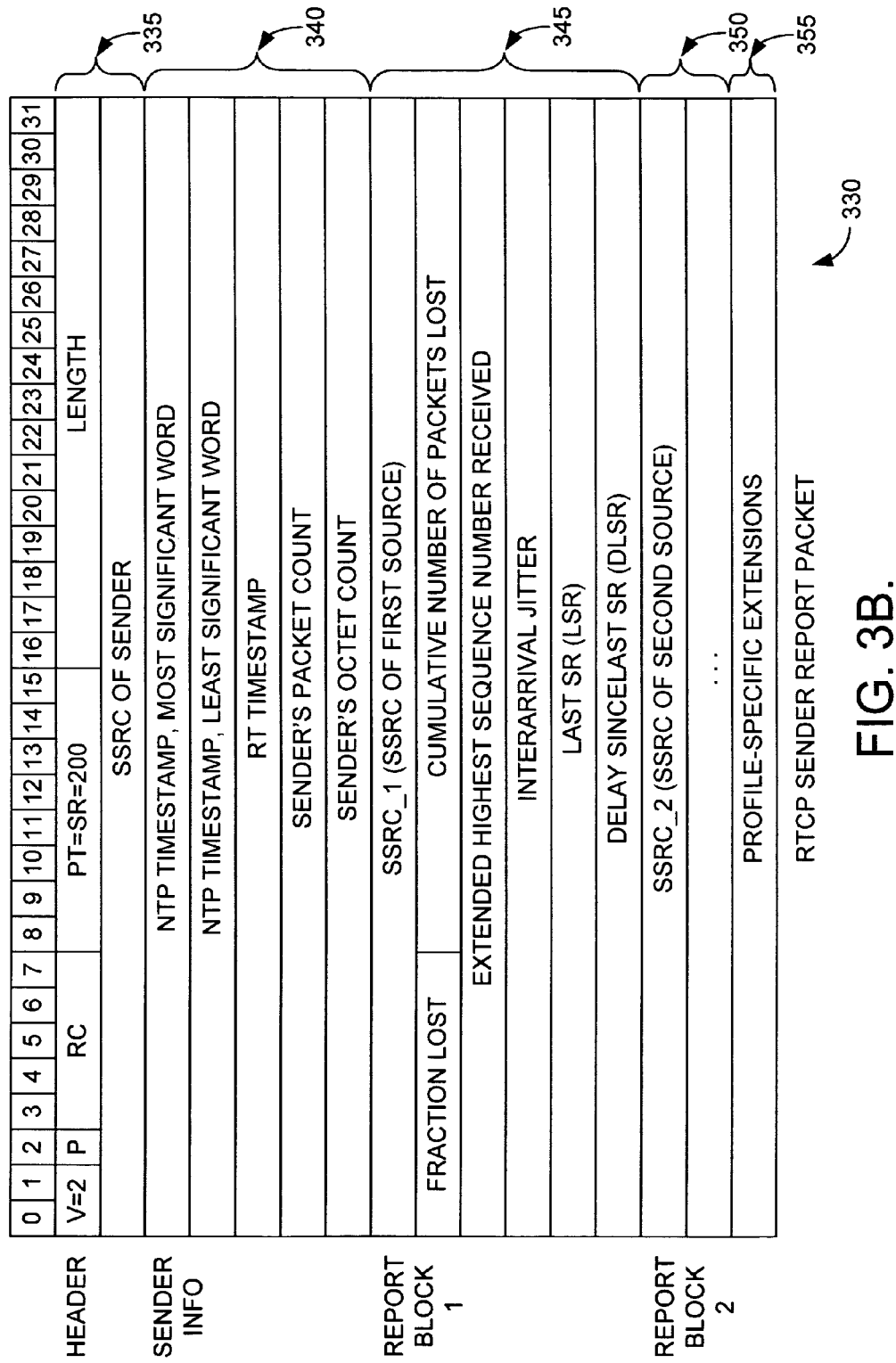
Figure 3C:
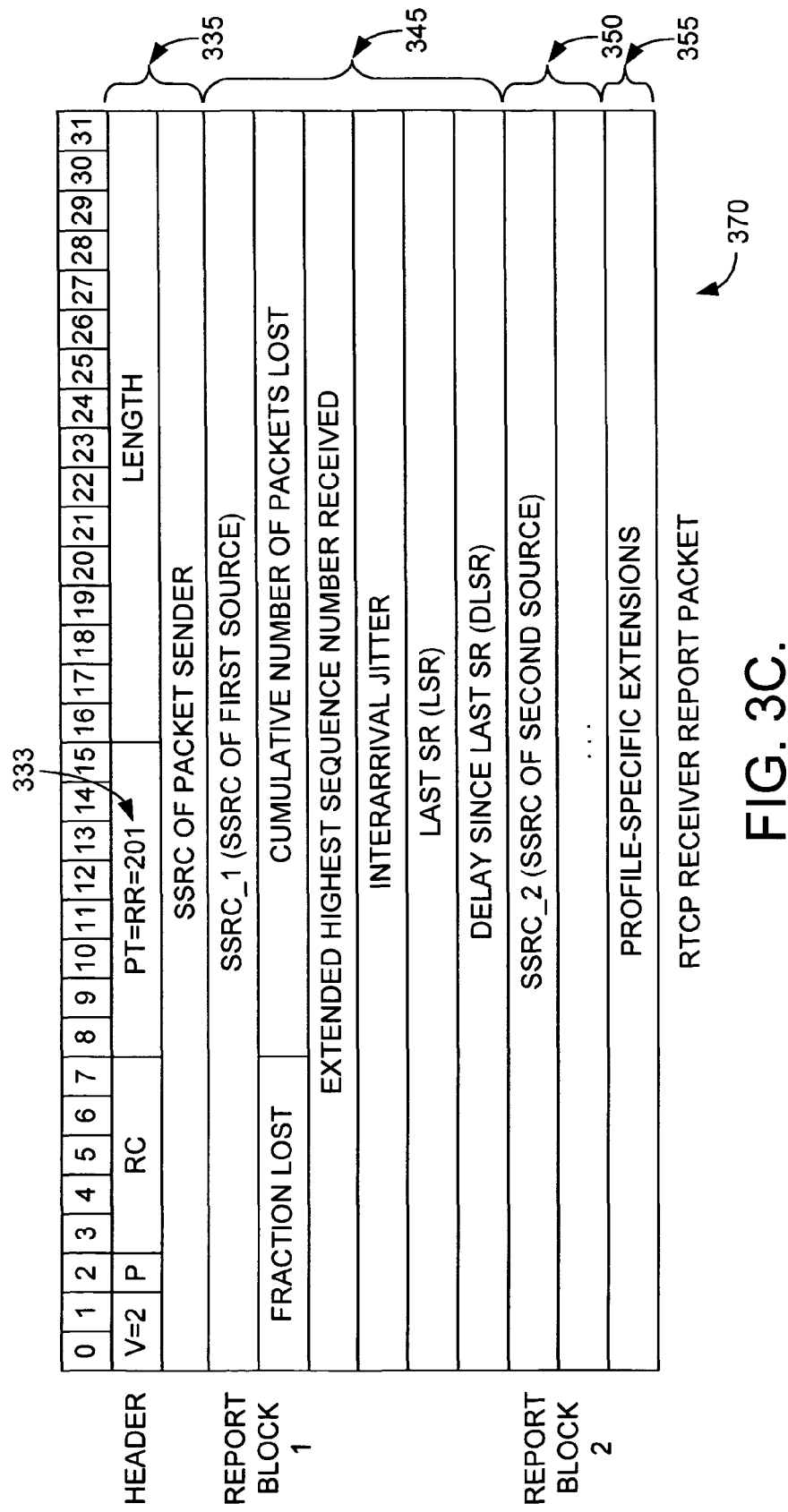

RTP senders and receivers are devices in the network that provide reception quality feedback using RTCP report packets as found in FIGS. 3B and 3C. An RTP sender may function simultaneously as an RTP receiver. In FIG. 3B, an RTCP Sender Report Packet (SRP) 330 is illustrated with packet information. SRP 330 may consist of three or more sections identified by a header 335, a sender info 340, a first report block 345, a second report block 350, and a profile 355. Header 335 contains the first section in SRP 330 and may be eight (8) octets long. Sender info 340 contains the second section in SRP 330 and may be twenty (20) octets long. Sender info 340 summarizes data transmissions from an RTP sender. First report block 345 and second report block 350 form the third section in SRP 330. First report block 245 and second report block 350 convey statistics on the reception of RTP packets from a single synchronization source. The third section of SRP 330 may vary in the number of report blocks, and in some cases, may not contain any report blocks. Finally, profile 355 may appear in SRP 330 in a fourth section when additional information needs to be reported about an RTP sender or receiver. Otherwise, it may not be included in the packet.

In FIG. 3C, an RTCP Receiver Report Packet (RRP) 370 is illustrated with packet information. RRP 370 is similar to SRP 330 except that a packet type code 333 contains a constant value and sender info 340 does not exists. Otherwise, RRP 370 may consist of header 335, zero or more report blocks as identified by first report block 345 and second report block 350, and profile 355.

In FIGS. 3B and 3C, SRP 330 and RRP 370 are briefly discussed. With regards to implementing an embodiment of the present invention, SRP 330 and RRP 370 may be used to calculate packet loss or calculate packet loss rate over a time interval. More details may be obtained on SRP 330 and RRP 370 by referring to RTP STANDARD, supra.

Turning now to FIG. 4, a block diagram of a table of transmission parameters for the ITU-T E-model is shown in table 400. Table 400 identifies the parameters of the ITU-T E-model that were discussed earlier in FIG. 1. For implementing an embodiment of the present invention, WEPL 128 and qdu 164 may have constant values different from values found in ITU-T G.107, supra. The parameters found in table 400 are used in the ITU-T E-model to calculate R-factors as discussed in FIG. 1.

Figure 5:
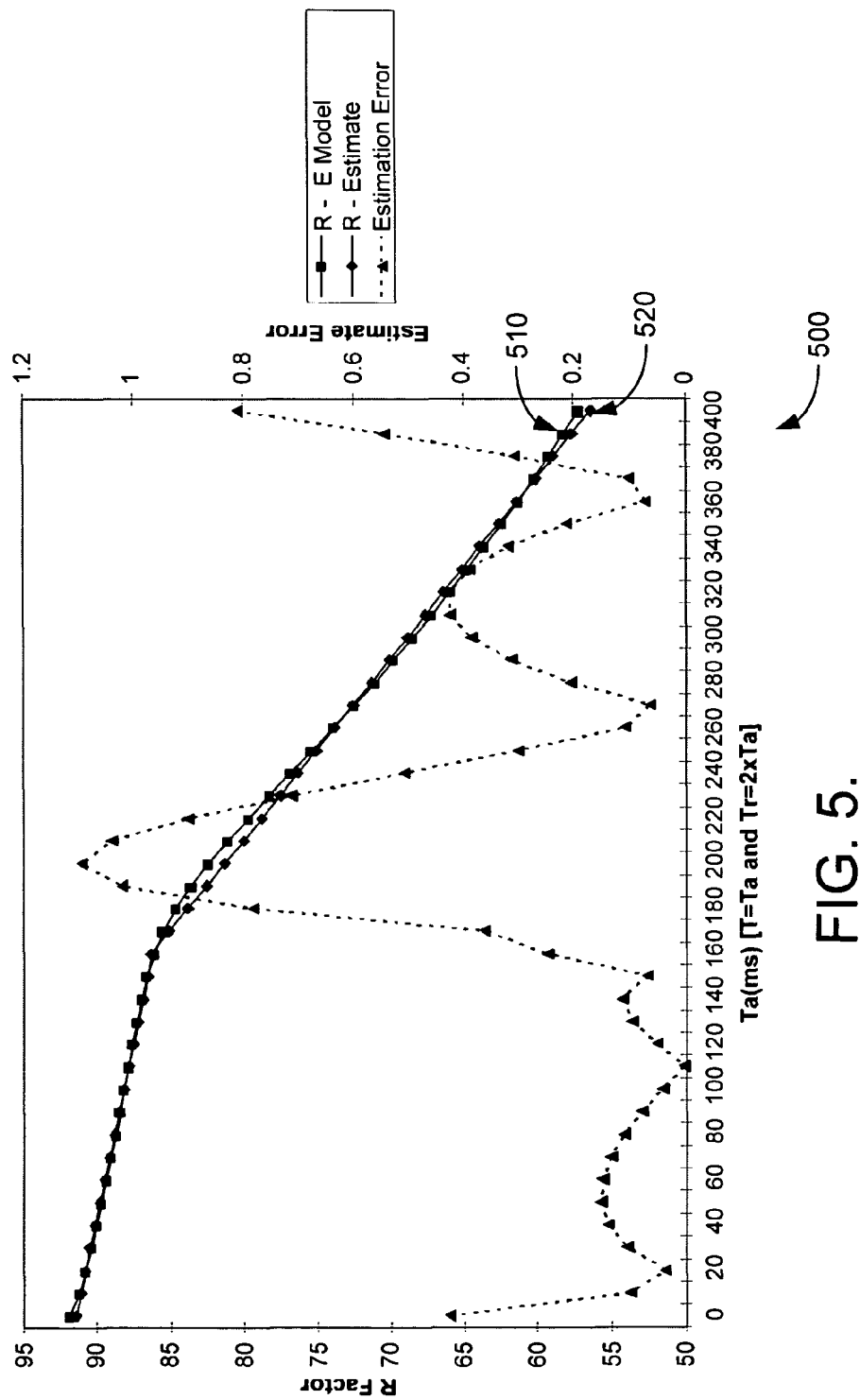
FIG. 5 is an exemplary graph of transmission rating factors (R factors) from an embodiment of the present invention.

By setting the parameters to a default value or some other constant value in the ITU-T E-model and measuring data, a linear or straight-line set of values may be obtained associated with the voice quality of the measured VOP call. The set of values may be illustrated in a graph 500 as depicted in FIG. 5 which shows an exemplary graph of an embodiment of the present invention. Graph 500 illustrates an actual R factor 510 and an estimate R factor 520. Actual R factor 510 depicts a graphical line of the measurements taken from the ITU-T E-model implementing actual values of the parameters associated with the ITU-T E-model. Estimate R factor 520 depicts a graphical line of the measurements taken from an implementation of an embodiment of the present invention whereby constant values and measured data are provided to simplify the calculations using the ITU-T E-model. Estimate R factor 520 contains constant values whereby packet loss is zero, jitter is less than ten (10) milliseconds, and the receiver jitter buffer is ten (10) milliseconds. As the graph may show, actual R factor 510 and estimate R factor 520 are similar.

An embodiment of the present invention may be implemented by setting some parameters in the ITU-T E-model to constants and calculating some parameters from linear equations using measured data and assumptions. For example, in the R factor formula ($R=Ro-Is-Id-Ie,eff+A$), Ro, Is, and A may be set to constant values. The values may be constant based upon knowledge about the network. Information which is constant in the network need not be calculated, and thus, may be established as a constant value. Id may be calculated using measured values of delay and jitter. Id may be calculated using a linear/straight-line estimate with assumptions for Tr 132, T 156, and Ta 160. Some of the assumptions include, but are not limited to, the following: Tr 132 equals two times Ta 160; and T 156 equals Ta 160. Ie,eff may be calculated from a linear equation or a table lookup for the values. As a result, the parameters of the R factor formula may contain constant values or values derived from linear equations using measured data. Calculating the R factor in this way simplifies the computation and reduces the complexity in determining values for the twenty-three (23) parameters of the ITU-T E-model. From the estimated values derived from the R factor, a conversion may occur to get an estimated voice quality.

Figure 6:
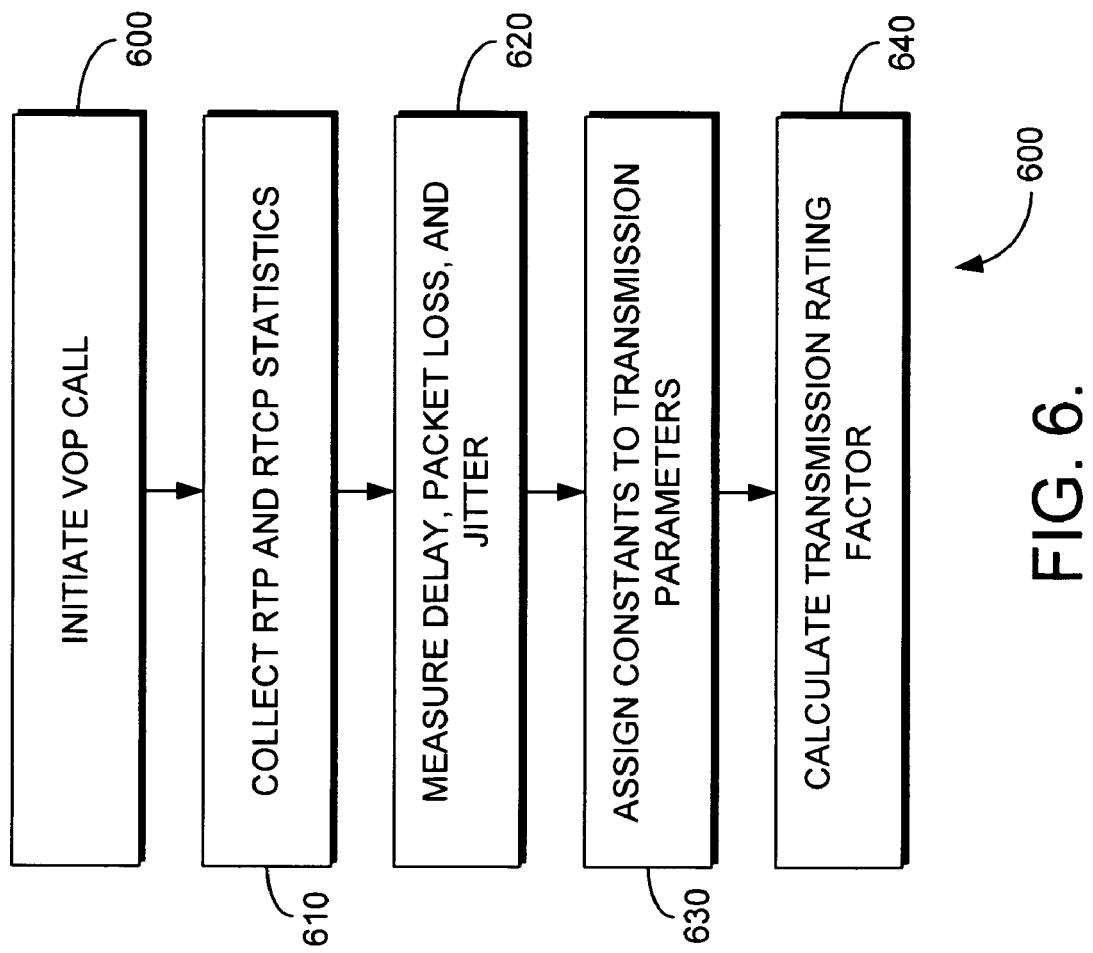
FIG. 6 is a flowchart of an exemplary process for calculating a transmission rating factor in a simplified manner when practicing an embodiment of the present invention.

In FIG. 6, a process for calculating a transmission rating factor in a simplified manner is shown in a method 600. In a step 600, a VOP call is initiated from an origination point to a termination point. During the process of the VOP call, RTP and RTCP statistics are collected about the VOP call in a step 610. These statistics are collected while the call is in progress providing real-time data that may be further analyzed. From the RTP and RTCP statistics, delay, packet loss and jitter may be measured in a step 620 identified earlier in FIGS. 3A, 3B, and 3C. In a step 630, constant values are assigned to transmission parameters associated with the ITU-T E-model. Step 630 simplifies the calculations in the ITU-T E-model to reduce the complexity in obtaining values for R-factors, as identified in a step 640. As shown earlier, the transmission rating factors may be plotted on a graph as shown in FIG. 5.

Figure 7:
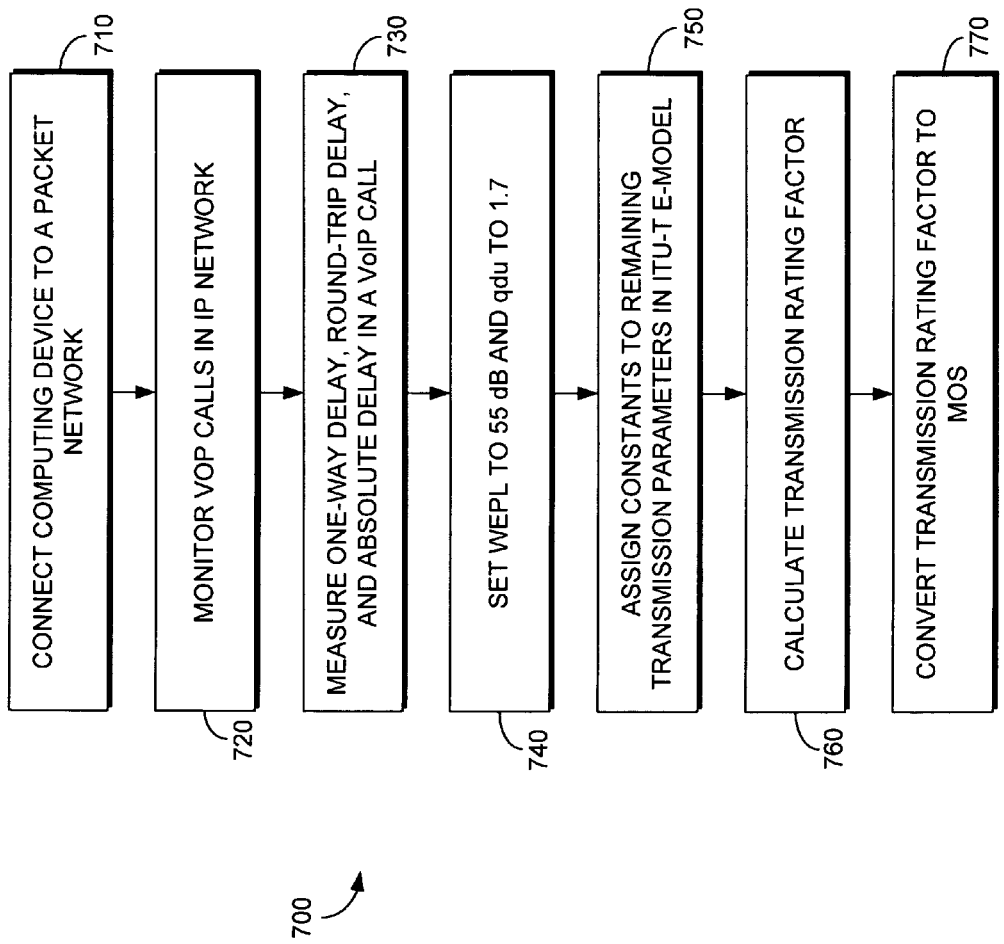
FIG. 7 is a flowchart of an exemplary process for estimating voice quality when practicing an embodiment of the present invention.

In FIG. 7, a process for estimating voice quality is shown in a method 700. Method 700 begins by connecting a computing device to a packet network such as VOP network, as shown in a step 710. The computing device may comprise various equipment including but not limited to a computer, telephone, or other devices containing monitoring or testing functions. In a step 720, the computing device may monitor VOP calls in the packet network as shown in a step 720. This monitoring may involve collecting data from the RTP and RTCP streams that occur in a VOP call. As discussed earlier, data is taken from the RTP and RTCP to provide information such as one-way delay, round-trip delay, and absolute delay as identified in a step 730.

Although not shown in method 700, the ITU-T E-model is used to calculate transmission rating factors using constant values. In a step 740, WEPL 128 and qdu 164 may be set to constant values to reflect conditions of the VOP call. Other transmission parameters may be assigned constant values to simplify the calculations in the ITU-T E-model as shown in a step 750. With the constant values, transmission rating factors may be measured as indicated in a step 760. From the transmission rating factors, a mean opinion score (MOS) may be calculated as shown in a step 770.

One ordinarily skilled in the art may note that a MOS is a value on a scale from 1 to 5 that indicates the performance of a telephone transmission system used for conversation or listening. A MOS may be separated into two categories: listening quality and conversational quality. Of the two quality categories, MOS may be based on a subjective model, objective model, or an estimate model. An embodiment of the present invention uses an estimate model to calculate the MOS. Other embodiments of the present invention may be implemented that use other models to calculate MOS. More details concerning MOS may be found in ITU-T RECOMMENDATION P.800.1, MEAN OPINION SCORE (MOS) TERMINOLOGY (MARCH 2003).

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer-implemented method for estimating voice quality in a voice over packet (VOP) network, comprising:
  at a computing device, collecting statistics from real-time transport protocol (RTP) and real-time transport control protocol (RTCP) streams in an actual VOP call, wherein the actual VOP call is a live call in a live traffic environment within the VOP network;
  measuring a delay, packet loss, and jitter from the collected statistics at the computing device;
  assigning constant values for a signal-to-noise ratio, an advantage factor, and simultaneous impairment factor based on an estimate derived from knowledge of the VOP network, wherein the signal-to-noise ratio, the advantage factor, and the simultaneous impairment factor are not calculated based on data collected during the live call; and
  using the delay, the packet loss, and the jitter from the collected statistics from the actual VOP call and the constant values to calculate a transmission rating factor using the ITU-T E-model.

2. The computer-implemented method of claim 1, wherein the Advantage Factor is assigned to be zero.

3. The computer-implemented method of claim 2, further comprising converting the transmission rating factor to an mean opinion score (MOS).

4. A computer-implemented method for calculating a transmission rating factor in a simplified manner, comprising:
  at a computing device connected to a network, measuring an absolute delay in real-time transport protocol (RTP) and real-time transport control protocol (RTCP) streams in an actual voice over packet (VOP) call, wherein the actual VOP call is a live call in a live traffic environment within the VOP network;
  setting a weighted echo path loss to 55 dB and a quantizing distortion unit to 1.7 at the computing device, the quantizing distortion unit corresponding to an echo canceller in a network path of the VOP call;
  assigning, at the computing device, constant values for a signal-to-noise ratio, an advantage factor, and simultaneous impairment factor based on estimates derived from knowledge of the VOP network, wherein the signal-to-noise ratio, the advantage factor, and the simultaneous impairment factor are not calculated based on data collected during the live call;
  assuming a perfect echo cancellation, setting, at the computing device, a round-trip delay equal to two times the absolute delay in a four-wire connection, and a mean one-way delay equal to the absolute delay; and
  calculating the transmission rating factor at the computing device using the constant values, the round-trip delay value, the absolute delay value, and the mean one-way delay value, the weighted echo path loss, and the quantizing distortion unit through the ITU-T E-model.

5. The computer-implemented method of claim 4, wherein assigning constant values to the plurality of parameters comprises assigning default values to the plurality of parameters.

6. The computer-implemented method of claim 5, further comprising converting the transmission rating factor to an mean opinion score (MOS).

7. One or more computer-storage media having computer-useable instructions executable by a computing device for performing a method for estimating voice quality in a voice over packet (VOP) network, comprising:
- at the computing device, collecting statistics from real-time transport protocol (RTP) and real-time transport control protocol (RTCP) streams in an actual VOP call, wherein the actual VOP call is a live call in a live traffic environment within the VOP network;
- assigning constant values for a simultaneous impairment factor based estimates derived from on knowledge of the VOP network, wherein the simultaneous impairment factor is not calculated based on data collected during the live call;
- using the delay, the packet loss, and the jitter from the collected statistics from the actual VOP call and the constant values to calculate a transmission rating factor using the ITU-T E-model; and
- converting the transmission rating factor to an MOS to determine voice quality.

8. The media of claim 7, wherein an advantage factor is assigned to be zero.

9. The media of claim 8, wherein the straight-line estimate comprises using default values and constants for a set of parameters.

10. A method for estimating voice quality in a voice over packet (VOP) network, comprising:
- at a device containing embedded logic, collecting statistics from real-time transport protocol (RTP) and real-time transport control protocol (RTCP) streams in an actual VOP call, wherein the actual VOP call is a live call in a live traffic environment within the VOP network;
- measuring a delay, packet loss, and jitter from the collected statistics at the device;
- assigning constant values for the simultaneous impairment factor based on estimates derived from knowledge of the VOP network, wherein the simultaneous impairment factor is not calculated based on data collected during the live call; and
- using the delay, the packet loss, and the jitter from the collected statistics from the actual VOP call and the constant values to calculate a transmission rating factor using the ITU-T E-model.

11. The method of claim 10, wherein the device is a phone.

12. The method of claim 11, wherein embedded logic is selected from the group comprising computer software and firmware.

13. The method of claim 12, wherein the Advantage Factor is assigned to be zero.

14. The method of claim 13, further comprising converting the transmission rating factor to an mean opinion score (MOS).

15. The method of claim 14, wherein using the straight-line estimate comprises using default values and constants for a set of parameters to calculate the transmission rating factor.

16. A method for calculating a transmission rating factor in a simplified manner, comprising:
- at a device containing embedded logic, measuring a mean one-way delay, a round-trip delay, and an absolute delay in real-time transport protocol (RTP) and real-time transport control protocol (RTCP) streams in an actual voice over packet (VOP) call, wherein the actual VOP call is a live call in a live traffic environment within the VOP network;
- setting a weighted echo path loss to 55 dB and a quantizing distortion unit to 1.7 at the computing device, the quantizing distortion unit corresponding to an echo canceller in a network path of the VOP call;
- assigning constant values for a simultaneous impairment factor based on estimates derived from knowledge of the VOP network, wherein the simultaneous impairment factor is not calculated based on data collected during the live call;
- assuming a perfect echo cancellation, setting, at the computing device, a round-trip delay equal to two times the absolute delay in a four-wire connection and a mean one-way delay equal to the absolute delay; and
- calculating the transmission rating factor at the computing device using the constant values, the round-trip delay value, the absolute delay value, and the mean one-way delay value, the weighted echo path loss, and the quantizing distortion unit through the ITU-T E-model.

17. The method of claim 16, wherein embedded logic is selected from the group comprising computer software and firmware.

18. The method of claim 17, wherein assigning constant values to the plurality of parameters comprises assigning default values to the plurality of parameters.

19. The method of claim 18, further comprising converting the transmission rating factor to an mean opinion score (MOS).

* * * * *